Figure 1:
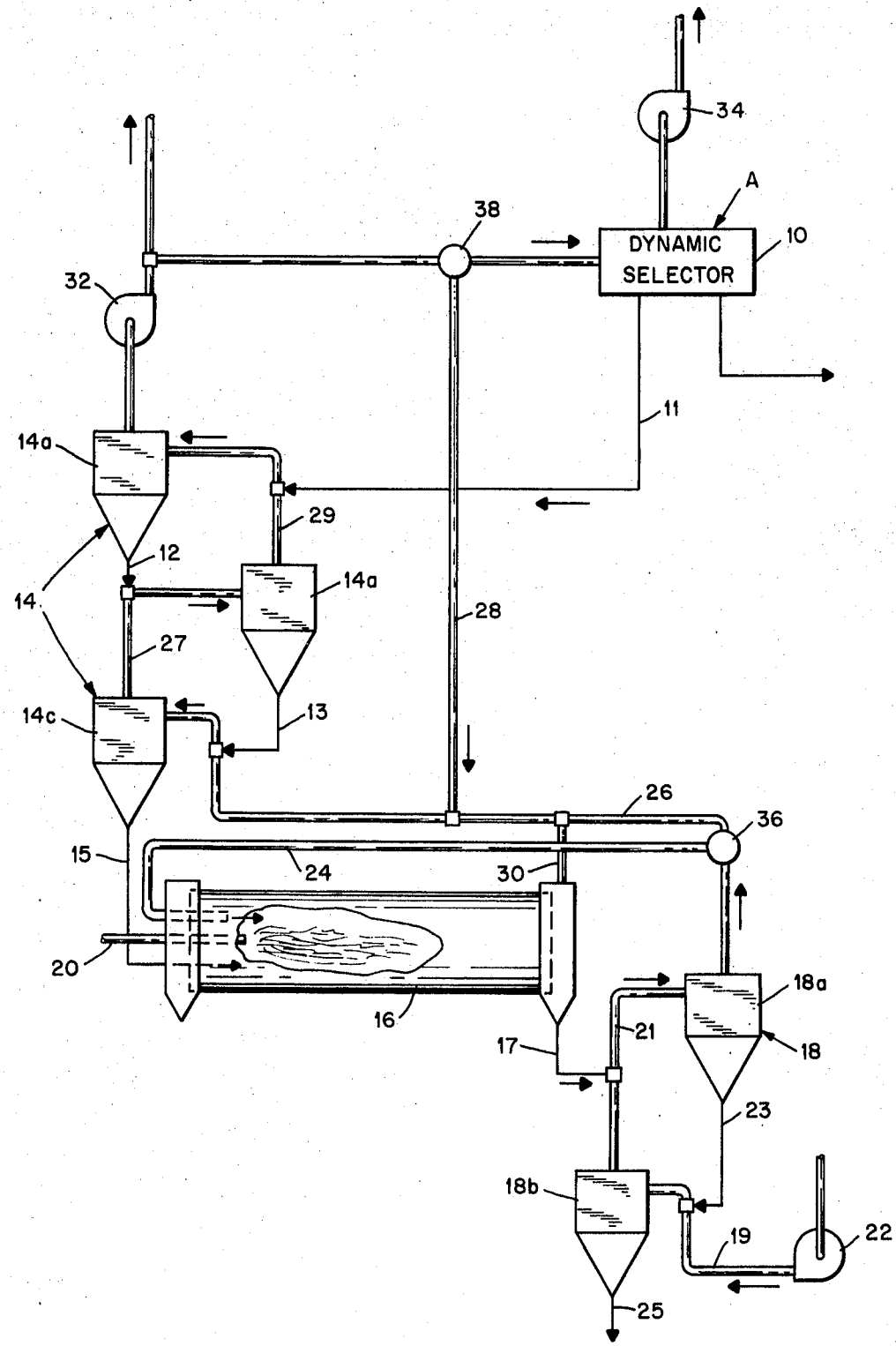

United States Patent [19]

Retali et al.

[11] 3,758,266

[45] Sept. 11, 1973

[54] CALCINING PROCESS AND INSTALLATION

[76] Inventors: Roger Retali, 14 Parc Bearn Rue Dailly, 92 Saint Cloud; Philippe Pithois, 660 avenue de la Republique, 59 Lille, both of France

[22] Filed: June 23, 1972

[21] Appl. No.: 265,756

[30] Foreign Application Priority Data
June 25, 1971 France .............................. 7123205

[52] U.S. Cl...................... 432/14, 432/80, 432/221
[51] Int. Cl............................................. F27b 7/02
[58] Field of Search.................... 432/103, 105, 106, 432/80, 82, 221, 14; 34/136

[56] References Cited
UNITED STATES PATENTS
2,663,560  12/1953  Muller et al. .......................... 432/14
3,521,866  7/1970  Knappstein et al. ................. 432/103

*Primary Examiner*—John J. Camby
*Attorney*—Kurt Kelman

[57] ABSTRACT

A phosphate or like mineral material is calcined in a rotary kiln after having been dried and preheated to a temperature lower than the normal reaction temperature of the material. The preheated material is introduced into the hottest zone of the kiln and passed therethrough in the same direction as hot calcining gases. The calcined material is cooled with a current of fresh air, a portion of the cooling air is mixed with the gases removed from the kiln, and the gas mixture is used to preheat the material.

7 Claims, 2 Drawing Figures

CALCINING PROCESS AND INSTALLATION

The present invention relates to the calcining of phosphate and analogous mineral materials to enrich such materials by dissociating carbonates into their constituent elements which are subsequently separated.

This treatment produces an exothermic reaction which starts at a temperature of the order of 250° C. to 600° C. It is believed that this reaction is due to the combustion of organic materials contained in the mineral and which are distilled to its surface.

It has been proposed to effectuate this treatment by rapidly bringing at least a portion of the raw material to be treated from a temperature lower than the normal temperature at which the exothermic reaction is produced to a temperature above such normal temperature by introducing the material into a high temperature zone of the calcining installation so that, for this portion of the material, the exothermic reaction is produced at a temperature higher than the normal reaction temperature.

Throughout the specification and claims "normal" reaction temperature means the average temperature at which the major portion of the material enters into the reaction when the temperature of the material is slowly raised, it being understood that the reaction starts at a temperature lower than this "normal" temperature and continues at temperatures higher than the "normal" temperature.

In this treatment, the calories freed by the exothermic reaction produced at a temperature above the normal reaction temperature are used to calcine the material, which reduces the fuel comsumption.

In one embodiment of this treatment, it has been proposed to introduce the dried and preheated raw material at a temperature lower than the normal reaction temperature in the hottest zone of a tubular rotary kiln, and the raw material and hot gases are passed through the kiln in the same direction to calcine the material. The calcined material and the gases are removed from the kiln, and the calcined material removed from the kiln is cooled with a current of air which is subsequently used as secondary air in the kiln.

It is the primary object of this invention to improve this calcining treatment by controlling the temperature of the raw material before it enters into the hot zone of the kiln so that the exothermic reation takes place essentially in this zone, and by avoiding calcination and sticking in the heat exchanger used for preheating the material.

This and other objects and advantages are accomplished in accordance with the invention by mixing a portion of the cooling air with the gases removed from the kiln after the air has cooled the calcined material, and using the mixture of the cooling air and the removed gases to preheat the raw material before it is introduced into the rotary kiln.

The calcining installation of the present invention comprises a cyclone preheater for the raw material, a tubular rotary kiln, a cyclone cooler for the material calcined in the kiln, and respective outlets for removing the hot gases from the kiln and for removing the cooling gases from the cooler. A conduit means connects the kiln and cooler outlets to the preheater for supplying the hot gases removed from the kiln and a portion of the cooling gases removed from the cooler to the preheater, and a branch conduit means connects the outlet of the cooler to the kiln for supplying the remainder of the cooling gases removed from the cooler to the kiln for use as secondary air.

Figure 2:
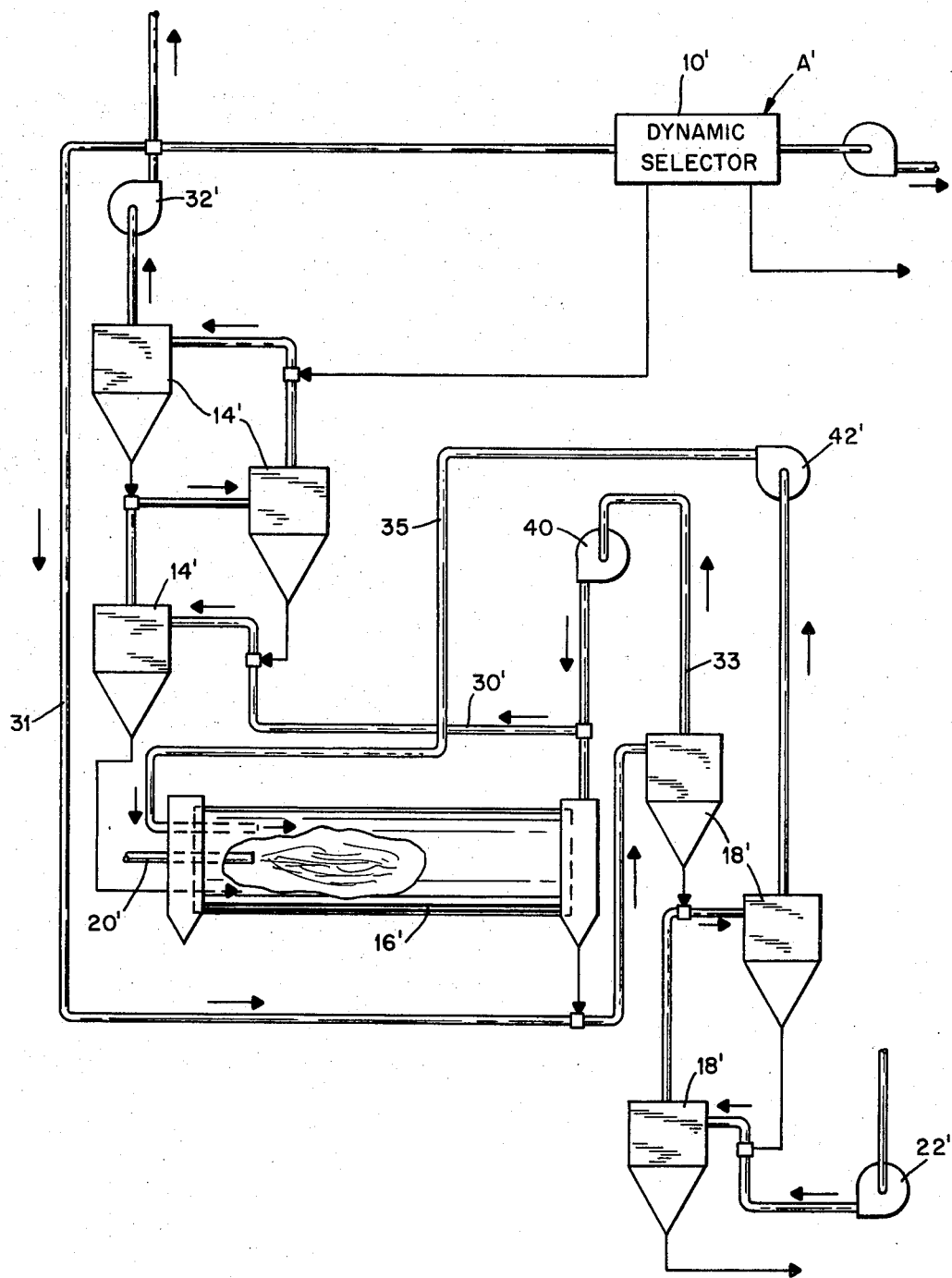

The above and other objects, advantages and features of this invention will be better understood by reference to the following detailed description of two now preferred embodiments thereof, taken in conjunction with the accompanying drawing wherein FIG. 1 is a schematic view of a calcining installation and FIG. 2 is a like view of another embodiment thereof.

The illustrated installations are useful for the treatment of phosphate minerals.

The installtion of FIG. 1 may be used with phosphate minerals wherein the fine grains of the raw material are sterile. This type of installation comprises a dynamic selector 10 or any other classigying device for clearly separating the material into fine grains removed from the device while the remainder is treated in the calcining installation.

The calcining installation proper comprises an assembly of cyclones constituting preheater 14, a tubular rotary kiln 16, and an assembly of cyclones constituting cooler 18. The cyclones of the preheater 14 are interconnected in a known manner so that the solid raw material passes through all the cyclones of the preheater before it is introduced into kiln 16 and that the heating gases pass from one cyclone into the next countercurrently to the passage of the material. The same conduit arrangement is used for the cyclones of the cooler 18.

In the embodiment of FIG. 1, three interconnected cyclones are used for preheater 14 and two interconnected cyclones form cooler 18 but it is obvious that the number of cyclones in each assembly may be varied and may be adapted to the nature of the material being treated.

A burner 20 is arranged at one end of the kiln 16 which the inlet of the kiln for the preheated material is located so that the material is introduced into the kiln in the hottest zone of the kiln and the hot gases from the burner pass in contact with the raw material through the kiln in the same direction to calcine the material.

A fan 22 in a fresh air supply conduit supplies fresh air to the cooler 18. The warm air leaving the cooler is divided into two streams. A branch conduit 24 connects the outlet of the cooler to the kiln for supplying one of the streams of the cooling gases removed from the cooler to the kiln for use as secondary or combustion air. A conduit means including a conduit 30 and a conduit 26 connecting the kiln outlet and the cooler outlet, respectively, to the preheater supplies the hot gases removed from the kiln and the other portion of the cooling gases removed from the cooler to the preheater. As shown, this mixture of hot gases and the other portion of the cooling gases is introduced in the last cyclone of the preheater, as determined by the direction of flow of the material through the series of cyclones of the preheater.

The gases are exhausted from the preheater by a fan 32 whose output is connect, on the one hand, to the selector 10, where the gases are used to dry the raw material, and, on the other hand, by a conduit 28 to the conduit means 26, 30 to mix a portion of these gases with the gas mixture supplied to the inlet of the preheater. A fan 34 expels the gases used in the selector to the atmosphere.

Valves 36 and 38 in their respective gas conduits are arranged to control, respectively, the portions of the cooling gases reaching the preheater and the kiln, and the portions of the preheater gases reaching the selector-drier and returned the preheater.

The mineral material entering the selector at A is dried therein by means of hot gases having an approximate temperature of 150° C., for instance, which are received from the preheater outlet provided in the first preheater cyclone, as determined by the direction of flow of the material through the series of preheater cyclones. The fine grains coming from the selector are removed while the remainder of the dried raw material is introduced into the first cyclone of the preheater by supply line 11. In this first cyclone, the material is heated to the average starting temperature for the exothermic reaction of the material. As shown, the gas mixture entering the last cyclone 14c by conduit 26 passes through conduit 27 into the intermediate cyclone 14b and thence through conduit 29 into first cyclone 14a while the material passes through supply line 12 into conduit 27 where it is carried by the gases therein into intermediate cyclone 14b whence supply line 13 feeds the material into conduit 26 wherein the gases move the material into last cyclone 14c. Supply line 15 feeds the material from the last cyclone to the inlet of the kiln. All gas conduits are shown in the drawing in double lines while all material supply lines are shown in full lines.

Upon entering the hottest zone of the kiln 16 at the inlet end, the calories produced by the combustion of fuel in burner 20 and of organic material in the mineral bring the temperature into the calcining range of about 700° C. to 950° C. The calcined material is conducted through supply line 17 into the cooler 18 where it is cooled to a temperature of about 100° C. The last cyclone 18b of the cooler receives the fresh air from fan 22 through conduit 19 and circulates this air into the first cyclone 18a through conduit 21 which carries the hot calcined material into cylone 18a. Supply line 23 feeds the material from cyclone 18a to cyclone 18b whence it leaves the installation through line 25.

In the cooler, the fresh air supplied by fan 22 is heated in contact with the calcined raw material to about 500° C. A portion of this heated air is directed to the inlet of the kiln by branch conduit 24 to provide combustion air while the other portion of the air coming from the cooler is mixed with the gases coming from the kiln to be directed through conduits 26 and 30 to the preheater. Thus, the preheater is fed by gases coming from the kiln and diluted not only by the cooling air coming from the cooler but also the gases removed from the preheater by fan 32. This double dilution of the hot kiln gases makes it possible carefully to control the temperature of preheating to that desired for the material at the entry into the calcining kiln. It also avoids calcining and sticking of the material in the preheating cyclones for certain raw materials.

In certain instances, the selector 10 may be eliminated if the nature of the raw material does not warrant its use.

The installation of FIG. 2 is in many respects the same as, or quite similar to that of, FIG. 1, including a selector-drier 10', an assembly 14' of three interconnected preheater cyclones, a tubular rotary kiln 16', and an assembly 18' of three interconnected cooler cyclones.

In this embodiment, a conduit 31 connects the exhaust fan 32', which removes the gases from the preheater 14', to the inlet of the first cooler cyclone which receives the calcined material from the kiln. The gas is exhausted from the outlet of this cyclone by conduit 33 connecting the outlet to exhaust fan 40 which delivers the exhausted cooling gases to conduit 30' delivering the hot kiln gases to the inlet of the last cyclone of the preheater.

The two other cyclones of the cooler 18' receive fresh air through fan 22' and, after having passed through the two cyclones, this air is exhausted by fan 42 and conducted in its totality to the inlet of the kiln by conduit 35 to provide the necessary combustion air for the burner fuel and the organic materials in the mineral material being calcined.

Again, the raw material is introduced into the selector-drier 10' at A and is classified into two different granular fractions, with the fine grains being removed and the remainder being conducted into the calcining installation, this raw material passing through the preheater countercurrently to the gas flow therein. As in the first-described embodiment, the preheated mineral material enters the rotary kiln wherein it is brought to the calcining temperature, the calcined material being cooled in cooler 18' where it is first cooled in the first cyclone by a fraction of the cooling gases having a temperature of about 150° C., these gases being exhausted after contact with the hot calcined material and being used to dilute the hot gases from the kiln for delivery to the preheater. The calcined material then passes through the other two cooling cyclones countercurrently to the air stream therein, the fresh air supplied by fan 22' being heated to about 300° C. in contact with the calcined material before being conducted to the kiln to serve as combustion air therein.

While the invention has been described in connection with two specific embodiments, it will be understood by those skilled in the art that many variations and modifications of specific but equivalent apparatus may be used without departing from the spirit and scope of this invention as defined in the appended claims.

What is claimed is:

1. Process of calcining a mineral material producing an exothermic reaction at a temperature lower than the maximum temperature of treatment of the material, comprising the steps of
    1. introducing the dried and preheated raw material at a temperature lower than the normal reaction temperature in the hottest zone of a tubular rotary kiln,
    2. passing the raw material and hot gases in contact therewith through the kiln in the same direction to calcine the material,
    3. removing the calcined material and the gases from the kiln,
    4. cooling the calcined material removed from the kiln with a current of air,
    5. mixing a portion of the cooling air with the gases removed from the kiln after the air has cooled the calcined material, and
    6. using the mixture of the cooling air and the removed gases to preheat the raw material before it is introduced into the rotary kiln.

2. The calcining process of claim 1, wherein a portion of the preheating gas mixture is returned after use for preheating the raw material.

3. The calcining process of claim 1, wherein the calcined material is first cooled, as it leaves the kiln, by a portion of the preheating gas mixture, this gas mixture portion is then mixed with the gases removed from the kiln, the calcined material is then cooled by the current of air, and a portion of the cooling air is introduced into the kiln as secondary air.

4. An installation for calcining a mineral material producing an exothermic reaction at a temperature lower than the maximum temperature of treatment of the material, comprising
   1. a cyclone preheater for the raw material,
   2. a tubular rotary kiln,
   3. a cyclone cooler for the material calcined in the kiln,
   4. an outlet for removing hot gases from the kiln,
   5. an outlet for removing cooling gases from the cooler,
   6. conduit means connecting the kiln outlet and the cooler outlet to the preheater for supplying the hot gases removed from the kiln and a portion of the cooling gases removed from the cooler to the preheater, and
   7. a branch conduit means connecting the outlet of the cooler to the kiln for supplying the remainder of the cooling gases removed from the cooler to the kiln for use as secondary air.

5. The installation of claim 4, wherein the preheater has a gas inlet and a gas outlet, and further comprising a return conduit for introducing a portion of the gases removed from the preheater gas outlet to the preheater gas inlet.

6. The installation of claim 4, further comprising a drier for the raw material ahead of the preheater, and additional conduit means for supplying gases removed from the preheater to the drier.

7. The installation of claim 4, wherein the preheater and the cooler each comprises a series of cyclones, and further comprising conduit means for supplying a portion of the gases removed from the preheater to the first one of the cyclones of the cooler which is entered by the calcined material coming from the kiln, said portion of the cooling gases being removed from said first cyclone, and the branch conduit means conducting the cooling gases from the other cyclones of the cooler to the kiln.

* * * * *